US012494328B2

(12) United States Patent
Taira

(10) Patent No.: US 12,494,328 B2
(45) Date of Patent: Dec. 9, 2025

(54) SOLID ELECTROLYTIC CAPACITOR AND MANUFACTURING METHOD THEREFOR

(71) Applicant: Panasonic Intellectual Property Management Co., Ltd., Osaka (JP)

(72) Inventor: Masahiko Taira, Kyoto Fu (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 117 days.

(21) Appl. No.: 18/546,948

(22) PCT Filed: Mar. 3, 2022

(86) PCT No.: PCT/JP2022/009125
§ 371 (c)(1),
(2) Date: Aug. 17, 2023

(87) PCT Pub. No.: WO2022/202189
PCT Pub. Date: Sep. 29, 2022

(65) Prior Publication Data
US 2024/0136125 A1  Apr. 25, 2024
US 2024/0234041 A9  Jul. 11, 2024

(30) Foreign Application Priority Data

Mar. 22, 2021  (JP) ................................. 2021-047686

(51) Int. Cl.
*H01G 9/15* (2006.01)
*H01G 9/00* (2006.01)
*H01G 9/26* (2006.01)
(52) U.S. Cl.
CPC ............. *H01G 9/26* (2013.01); *H01G 9/0029* (2013.01); *H01G 9/15* (2013.01)

(58) Field of Classification Search
None
See application file for complete search history.

(56) References Cited

U.S. PATENT DOCUMENTS

2006/0262487 A1* 11/2006 Kurita .................... H01G 9/012
361/528
2007/0019366 A1* 1/2007 Yamaguchi .............. H01G 9/08
361/540

(Continued)

FOREIGN PATENT DOCUMENTS

JP    S59-123220 A    7/1984
JP    2007-005760 A   1/2007

(Continued)

OTHER PUBLICATIONS

Translation of JP 2009260235 (Year: 2009).*

(Continued)

*Primary Examiner* — Dion R. Ferguson
(74) *Attorney, Agent, or Firm* — Rimon P.C.

(57) ABSTRACT

A plurality of capacitor elements laminated on top of another. The capacitor elements each including a first and second portion, where the first portion includes a first and second edge disposed opposite each other in a first direction D1 and at least a portion of the first portion forms a cathode portion, and the second portion projects from the first edge of the first portion and at least a portion of the second portion forms an anode portion. In one or more capacitor elements, the first edge is positioned at one side in direction D1, and the second edge is positioned at the other direction D1. In the remaining capacitor elements, the first edge is positioned at the other side in direction D1 and the second edge is positioned at one side in direction D1.

9 Claims, 4 Drawing Sheets

(56) References Cited

U.S. PATENT DOCUMENTS

2017/0040116 A1* 2/2017 Djebara .................. H01G 9/15
2024/0234041 A9* 7/2024 Taira ........................ H01G 9/26

FOREIGN PATENT DOCUMENTS

| JP | 2007-035691 | A | | 2/2007 | | |
|----|----|----|----|----|----|----|
| JP | 2007-116064 | A | | 5/2007 | | |
| JP | 2009-135167 | A | | 6/2009 | | |
| JP | 2009260235 | A | * | 11/2009 | ............... | H01G 2/02 |
| JP | 2010087001 | A | * | 4/2010 | | |
| JP | 4793938 | B2 | * | 10/2011 | | |
| JP | 4872365 | B2 | * | 2/2012 | ............... | H01G 2/06 |
| JP | 2016-535397 | A | | 11/2016 | | |

OTHER PUBLICATIONS

International Search Report dated May 24, 2022 issued in International Patent Application No. PCT/JP2022/009125, with English translation.

* cited by examiner

SOLID ELECTROLYTIC CAPACITOR AND MANUFACTURING METHOD THEREFOR

CROSS-REFERENCE OF RELATED APPLICATIONS

This application is the U.S. National Phase under 35 U.S.C. § 371 of International Patent Application No. PCT/JP2022/009125, filed on Mar. 3, 2022, which in turn claims the benefit of Japanese Patent Application No. 2021-047686, filed on Mar. 22, 2021, the entire disclosures of which Applications are incorporated by reference herein.

TECHNICAL FIELD

The present disclosure relates to a solid electrolytic capacitor and a production method therefor.

BACKGROUND ART

Conventionally, a solid electrolytic capacitor including a plurality of capacitor elements each having an anode portion and a cathode portion and laminated on top of another has been known (e.g., Patent Literature 1). In the solid electrolytic capacitor of Patent Literature 1, the plurality of capacitor elements are laminated alternately, with the cathode portion as a center and the anode portions facing each other. Such a laminate structure can decrease, the equivalent series inductance (ESL) of the solid electrolytic capacitor.

CITATION LIST

Patent Literature

PLT1: Japanese Laid-Open Patent Publication No. 2007-116064

SUMMARY OF INVENTION

A solid electrolytic capacitor in an aspect of the present disclosure includes a plurality of capacitor elements laminated on top of another, the capacitor elements each including a first portion and a second portion, wherein the first portion includes a first edge and a second edge disposed opposite to each other in a first direction and at least a portion of the first portion forms a cathode portion, and the second portion projects from a portion of the first edge of the first portion and at least a portion of the second portion forms an anode portion, in one or some of the plurality of capacitor elements, the first edge is positioned at one side in the first direction, and the second edge is positioned at the other side in the first direction, in the remaining of the plurality of capacitor elements, the first edge is positioned at the other side in the first direction and the second edge is positioned at one side in the first direction.

A method for producing a solid electrolytic capacitor in another aspect of the present disclosure includes a preparation step of preparing a plurality of capacitor elements, the capacitor elements each including a first portion and a second portion, wherein the first portion includes a first edge and a second edge disposed opposite to each other and at least a portion of the first portion forms a cathode portion, and the second portion projects from a portion of the first edge of the first portion and at least a portion of the second portion forms an anode portion; a lamination step of laminating the plurality of capacitor elements with a conductive paste interposed therebetween so that one or some of the first edges are positioned at one side in the first direction and the remaining first edges are positioned at the other side in the first direction; and a curing step of curing the conductive paste while allowing a first jig and a second jig to abut on the laminated plurality of capacitor elements, wherein the first jig is abutted on the first edge and the second edge at one side in the first direction and the second jig is abutted on the first edge and the second edge at the other side in the first direction.

With the present disclosure, misalignment of a plurality of capacitor elements can be suppressed.

DESCRIPTION OF EMBODIMENTS

Figure 1:
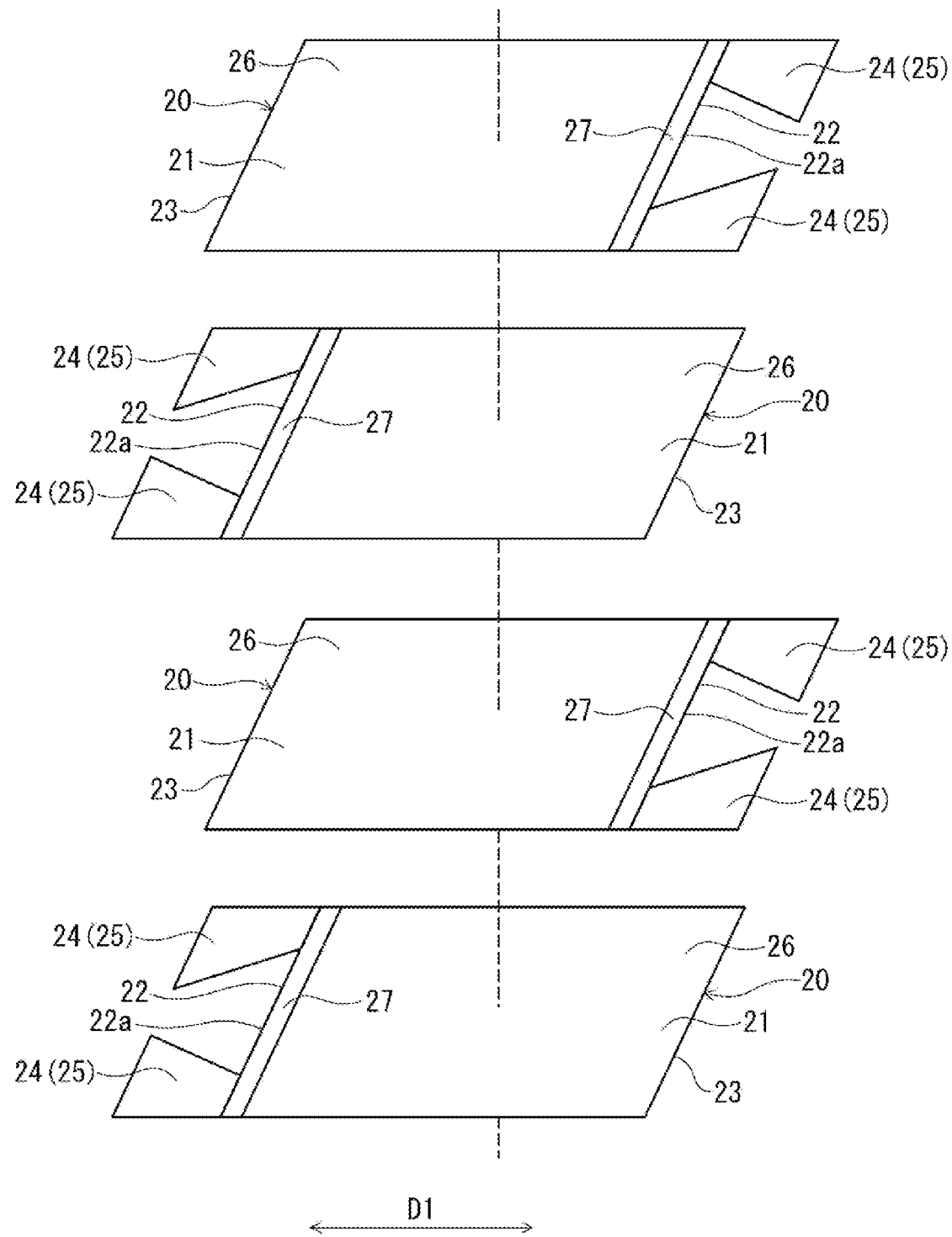
FIG. 1 is a perspective view illustrating a plurality of capacitor elements included in a solid electrolytic capacitor of Embodiment 1.

Before describing embodiments, problems in conventional techniques are described briefly below.

In production processes of a solid electrolytic capacitor having a laminate structure, when laminating a plurality of capacitor elements, a conductive paste has to be interposed therebetween. However, the conductive paste causes the capacitor element to slide, and this may cause misalignment of the plurality of capacitor elements.

In view of the above-described problem, the present disclosure provides a solid electrolytic capacitor with which misalignment of a plurality of capacitor elements is suppressed.

Embodiments of a solid electrolytic capacitor and a production method therefor of the present disclosure are described below with reference to examples. The present disclosure, however, is not limited to the following examples. In the following description, specific numerical values and materials may be exemplified, but other numerical values and other materials may be used as long as the effect of the present disclosure is obtained.

(Solid Electrolytic Capacitor)

The solid electrolytic capacitor of the present disclosure includes a plurality of capacitor elements laminated on top of another. Each of the capacitor elements has a first portion and a second portion.

The first portion includes a first edge and a second edge disposed opposite to each other in a first direction. At least a portion of the first portion forms a cathode portion of the capacitor element. The first portion may be formed into a rectangular sheet, and the first edge and the second edge may be short sides of the first portion, respectively. The first edge and the second edge may be substantially parallel to each other. The first portion may include, for example, a portion of an anode body, a dielectric layer covering at least a portion thereof, a solid electrolyte layer formed on a surface of the dielectric layer, and a cathode layer formed on a surface of the solid electrolyte layer.

The anode body may be, for example, a foil composed of valve metals such as aluminum, tantalum, niobium, and titanium. The dielectric layer may be formed of, for example, an oxide of valve metal formed by anodization or a gas phase method such as vapor deposition on a surface of a portion of the anode body. The solid electrolyte layer may include a conductive polymer. The solid electrolyte layer may further include, as necessary, a dopant, an additive, etc.

Examples of the conductive polymer include those known ones used for solid electrolytic capacitors such as, for example, a π-conjugated conductive polymer. Examples of the conductive polymer include a polymer having polypyrrole, polythiophene, polyaniline, polyfuran, polyacetylene, polyphenylene, polyphenylene vinylene, polyacene, and polythiophene vinylene as a basic skeleton. Preferably, among these, a polymer having polypyrrole, polythiophene, or polyaniline as a basic skeleton is used. The above-described polymer also includes a homopolymer, a copolymer of two or more types of monomers, and derivatives thereof (substituted product having substituents, etc.). For example, polythiophene includes poly(3,4-ethylene dioxythiophene). The conductive polymer may be used singly, or two or more types may be used in combination.

Examples of the dopant include at least one selected from the group consisting of an anion and a polyanion. Examples of the anion include, for example, sulfuric acid ion, nitric acid ion, phosphoric acid ion, boric acid ion, organic sulfonic acid ion, and carboxylic acid ion, without particular limitation. Examples of the dopant that generates sulfonic acid ions include benzene sulfonic acid, p-toluene sulfonic acid, and naphthalene sulfonic acid. Examples of the polyanion include, a polymer type polysulfonic acid and a polymer type polycarboxylic acid. Examples of the polymer type polysulfonic acid include polyvinyl sulfonic acid, polystyrene sulfonic acid, polyallyl sulfonic acid, polyacryl sulfonic acid, and polymethacryl sulfonic acid. Examples of the polymer type polycarboxylic acid include polyacrylic acid and polymethacrylic acid. The polyanion also includes polyester sulfonic acid, and a phenol sulfonic acid novolak resin. However, the polyanion is not limited to these.

The solid electrolyte layer may further include, as necessary, known additives, and known conductive materials other than the conductive polymer. Examples of such a conductive material include at least one selected from the group consisting of a conductive inorganic material such as manganese dioxide, and a TCNQ complex salt.

The cathode layer may be formed of a carbon layer formed on a surface of the solid electrolyte layer and a conductive layer formed on a surface of the carbon layer. The conductive layer may be formed, for example, of a silver paste. Examples of the silver paste include a composition including silver particles and a resin component (binder resin). For the resin component, a thermoplastic resin may also be used, but preferably, thermosetting resins such as imide resin and epoxy resin are used.

The second portion projects from a portion of the first edge of the first portion. That is, the first edge of the first portion includes a portion where the second portion projects, and a flat portion that does not project (hereinafter, also referred to as a flat portion). At least a portion of the second portion forms an anode portion of the capacitor element. The second portion may include, for example, a remaining portion of the anode body.

Although a region (a portion of the anode body) that functions as the anode is present in the first portion, the "anode portion" in this specification is used as not including such a region in the first portion. For example, the capacitor element has an insulating portion that electrically insulates the anode portion from the cathode portion, and the anode portion can be a portion opposite to the cathode portion with the insulating portion interposed therebetween. The insulating portion may be included in the first portion or in the second portion.

In one or some of the plurality of capacitor elements (hereinafter, also referred to as a capacitor element A), the first edge is positioned at one side in the first direction, and the second edge is positioned at the other side in the first direction. Also, in the remaining of the plurality of capacitor elements (hereinafter, also referred to as a capacitor element B), the first edge is positioned at the other side in the first direction, and the second edge is positioned at one side in the first direction. As described above, in the capacitor element A, the anode portion is positioned at one side of the cathode portion in the first direction, and in the capacitor element B, the anode portion is positioned at the other side of the cathode portion in the first direction. That is, the capacitor element A and the capacitor element B are disposed so that the anode portions are facing opposite directions in the first direction.

By disposing the plurality of capacitor elements in such a manner, the magnetic field generated by the electric current flowing in the capacitor element A and the magnetic field generated by the electric current flowing in the capacitor element B are compensated for by each other. This is because the former electric current and the latter electric current flow in substantially opposite directions. In this manner, the ESL of the solid electrolytic capacitor may decrease.

Furthermore, the first edge of the first portion of each of the capacitor elements includes the flat portion as described above. In the capacitor element A, the flat portion is positioned at one side in the first direction, whereas in the capacitor element B, the flat portion is positioned at the other side in the first direction. When the plurality of capacitor elements are laminated on top of another without being dislocated, the flat portion of the capacitor element A is flush with the second edge of the first portion of the capacitor element B, and the flat portion of the capacitor element B is flush with the second edge of the first portion of the capacitor element A. In other words, by laminating the capacitor element A and the capacitor element B while keeping such a state of being flush with each other, misalignment of the plurality of capacitor elements can be suppressed. For example, a jig may be used to keep such a state of being flush with each other.

The capacitor element A and the capacitor element B may be laminated alternately one by one. The capacitor element A and the capacitor element B may be laminated alternately group by group. The capacitor element A and the capacitor element B may have the same shape, or may have a shape different from each other.

Each of the capacitor element may have three or less second portions. Such a configuration allows the second portion to have a high mechanical strength. Thus, a higher yield can be achieved in solid electrolytic capacitor production.

Preferably, when the number of the second portions is two or more per one capacitor element, in each of the capacitor elements, the plurality of second portions are not connected to each other. Preferably, in other words, gaps are provided between the plurality of second portions. In this manner, when a jig and the like are used for solid electrolytic capacitor production, the jig can easily access the flat portion through the gap between the plurality of second portions. However, the description in this paragraph does not exclude the plurality of second portions connected to each other indirectly through the first portion.

The number of the second portions per one capacitor element may be two, and in each of the capacitor elements, one of the second portions may be projected from one end portion of the first edge, and the other of the second portions may be projected from the other end portion of the first edge. In this configuration, one flat portion is disposed between two second portions (or a center region of the first edge). To keep the above-described state of being flush with each other, using one jig and the like for one side and one for the other side in the first direction will suffice. Thus, in addition to achieving the second portion with a higher mechanical strength, the solid electrolytic capacitor can be easily produced.

In each of the capacitor elements, a total of the width of a proximal end portion of the second portion may be 20% or more and 90% or less of the length of the first edge. By setting the total of the width of the proximal end portion of the second portion to 20% or more of the length of the first edge, the mechanical strength of the second portion can be sufficiently made high. By setting the total of the width of the proximal end portion of the second portion to 90% or less of the length of the first edge, the length of the flat portion can be sufficiently long. The width of the proximal end portion of the second portion means the length of the proximal end portion of the second portion along the length direction of the first edge.

The width of the tip end portion of the second portion may be larger than the width of the proximal end portion of the second portion. In this manner, for example, when the plurality of second portions overlapped with each other in the lamination direction are welded at the tip end portion or near the tip end portion, the area necessary for welding can be ensured. The width of the tip end portion of the second portion means the length of the tip end portion of the second portion along the length direction of the first edge.

The width of the insulating portion may be 30% or more and 100% or less of the width of the proximal end portion of the second portion, or 50% or more and 100% or less of the width of the proximal end portion of the second portion. The width of the insulating portion may be 90% or more and 100% or less of the length of the first edge of the first portion. The width of the insulating portion may be larger than the width of the proximal end portion of the second portion, and smaller than the length of the first edge. The width of the insulating portion means the length of the insulating portion along the length direction of the first edge.

(Solid Electrolytic Capacitor Production Method)

A method for producing a solid electrolytic capacitor of the present disclosure includes a preparation step, a lamination step, and a curing step.

In the preparation step, a plurality of capacitor elements having a first portion and a second portion is prepared. The first portion includes a first edge and a second edge disposed opposite to each other and at least a portion thereof forms a cathode portion. The second portion projects from a portion of the first edge of the first portion and at least a portion thereof forms an anode portion. An insulating portion may be provided between the cathode portion and the anode portion to electrically insulate each other.

In the lamination step, the plurality of capacitor elements are laminated with a conductive paste interposed therebetween so that one or some first edges are positioned at one side in the first direction and the remaining first edges are positioned at the other side in the first direction. That is, in the lamination step, the plurality of capacitor elements are laminated so that the anode portion of the capacitor element A and the anode portion of the capacitor element B are facing opposite directions. The conductive paste may be a paste including metal (e.g., silver).

In the curing step, the conductive paste is cured while allowing a first jig and a second jig to abut on the laminated plurality of capacitor elements. In the curing step, while allowing the first jig to abut on the first edge and the second edge at one side in the first direction, the second jig is allowed to abut on the first edge and the second edge of the other side in the first direction. In this manner, while keeping the first edge and the second edge at one side in the first direction being flush with each other and the first edge and the second edge at the other side in the first direction being flush with each other, the conductive paste can be cured. That is, sliding of the plurality of capacitor elements is prevented during curing of the conductive paste, and misalignment of these can be suppressed.

As described above, with the present disclosure, misalignment of the plurality of capacitor elements can be suppressed. Furthermore, with the present disclosure, the ESL of the solid electrolytic capacitor can be decreased.

In the following, an example of the solid electrolytic capacitor and production method therefor of the present disclosure is described in detail with reference to the drawings. For the elements and steps of examples of the solid electrolytic capacitor and production method therefor described in the following, the above-described elements can be used. The elements and the steps of the solid electrolytic capacitor and production method therefor described in the following can be changed based on the description above. The matters described below can also be applied to the above-described embodiment. Of the elements and steps of examples of the solid electrolytic capacitor and production method therefor described below, elements that are not essential to the solid electrolytic capacitor and production method therefor of the present disclosure can be omitted. The figures shown below are schematic, and do not accurately represent shapes and numbers of actual members.

Embodiment 1

Figure 2:
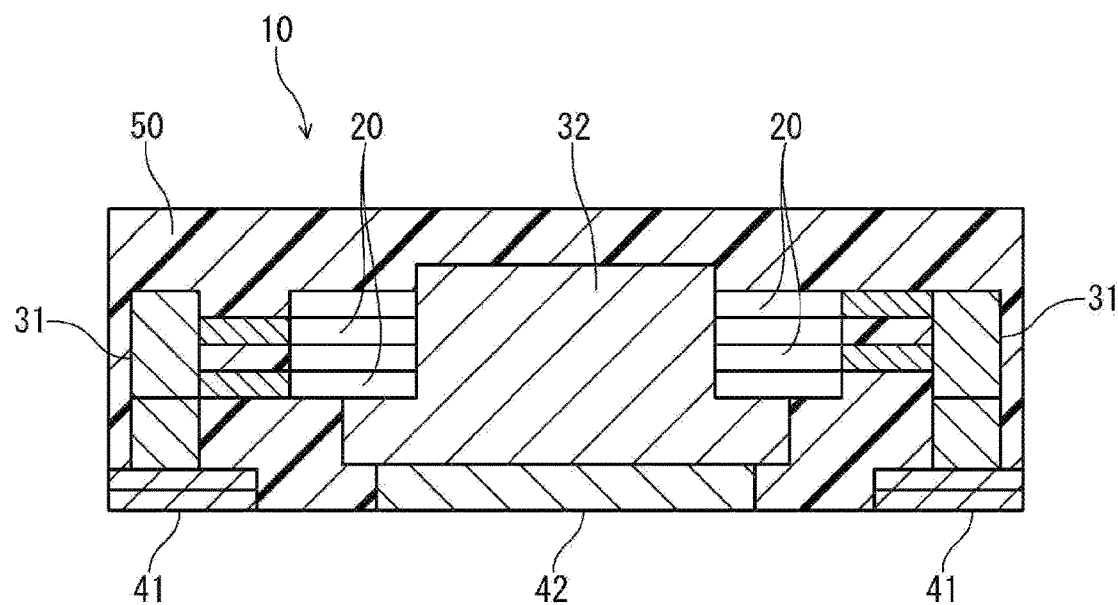
FIG. 2 is a cross sectional view schematically showing a configuration of the solid electrolytic capacitor of Embodiment 1.

Embodiment 1 of the present disclosure is described. As shown in FIG. 1 and FIG. 2, a solid electrolytic capacitor 10 of this embodiment includes a plurality of capacitor elements 20, an anode lead frame 31, a cathode lead frame 32, an anode lead terminal 41, a cathode lead terminal 42, and an exterior resin 50.

The plurality of capacitor elements 20 each has a first portion 21 and a second portion 24, and they are laminated on top of another.

The first portion 21 includes a first edge 22 and a second edge 23 disposed opposite to each other in a first direction D1. The first portion 21 is formed into a rectangular sheet having long sides extending in the first direction D1. A portion of the first portion 21 forms a cathode portion 26 of the capacitor element 20. The cathode portion 26 includes, without illustration in the figures, a portion of an anode body, a dielectric layer covering at least a portion thereof, a solid electrolyte layer formed on a surface of the dielectric layer, and a cathode layer formed on a surface of the solid electrolyte layer. An insulating portion 27 covering a portion of the anode body is formed on the remaining portion (a portion of the second portion 24 side) of the first portion 21. The insulating portion 27 may be a tape composed of an insulating material, or may be composed by applying a liquid resist. The insulating portion 27 may be compressed.

The second portion 24 projects from a portion of the first edge 22 of the first portion 21. The capacitor element 20 of this embodiment each has two second portions 24. In each of the capacitor elements 20, one second portion 24 projects from one end portion of the first edge 22, and the other second portion 24 projects from the other end portion of the first edge 22. Therefore, in each of the capacitor elements 20, one flat portion 22a is formed at a center region of the first edge 22. The second portion 24 forms an anode portion 25 of the capacitor element 20. The second portion 24 includes the remaining portion of the anode body.

The second portion 24 is formed into a substantially trapezoid sheet. The width of the second portion 24 increases toward the tip end portion from the proximal end portion. Therefore, the width of the tip end portion of the second portion 24 is larger than the width of the proximal end portion of the second portion 24. In each of the capacitor elements 20, a total of the width of the proximal end portion of the second portion 24 (in this example, twice the width of the proximal end portion of each second portion 24) is 30% or more and 70% or less of the length of the first edge 22. In each of the capacitor elements 20, a total of the width of the tip end portion of the second portion 24 (in this example, twice the width of the tip end portion of each second portion 24) is 30% or more and 90% or less of the length of the first edge 22.

In one or some of the plurality of capacitor elements 20 (in FIG. 1, 1st and 3rd capacitor elements 20 from the bottom. In the following, also referred to as the capacitor element A), the first edge 22 is positioned at one side in the first direction D1 (left side in FIG. 1), and the second edge 23 is positioned at the other side in the first direction D1. In the remaining of the plurality of capacitor elements 20 (in FIG. 1, the 2nd and the 4th capacitor element 20 from the bottom. In the following, also referred to as the capacitor element B), the first edge 22 is positioned at the other side in the first direction D1 (right side in FIG. 1), and the second edge 23 is positioned at one side in the first direction D1. The capacitor element A and the capacitor element B are laminated alternately one by one.

The anode lead frame 31 electrically connects the anode portion 25 of the plurality of capacitor elements 20. The anode lead frame 31 is formed of a conductive material such as metal.

The cathode lead frame 32 electrically connects the cathode portion 26 of the plurality of capacitor elements 20. The cathode lead frame 32 is formed of a conductive material such as metal.

The anode lead terminal 41 is joined to a lower portion of the anode lead frame 31. The anode lead terminal 41 is formed of a conductive material such as metal. A portion of the anode lead terminal 41 is exposed from the exterior resin 50, and forms an anode terminal portion when the solid electrolytic capacitor 10 is mounted. The anode lead terminal 41 may be formed integrally with the anode lead frame 31.

The cathode lead terminal 42 is joined to a lower portion of the cathode lead frame 32. The cathode lead terminal 42 is formed of a conductive material such as metal. A portion of the cathode lead terminal 42 is exposed from the exterior resin 50, and forms a cathode terminal portion when the solid electrolytic capacitor 10 is mounted. The cathode lead terminal 42 may be formed integrally with the cathode lead frame 32.

The exterior resin 50 is an insulating member covering the plurality of capacitor elements 20, the anode lead frame 31, the cathode lead frame 32, the anode lead terminal 41, and the cathode lead terminal 42 integrally. The exterior resin 50 includes a resin material as an essential component, and a filler as an optional component. For the filler, ceramic particles such as inorganic oxide are preferably used.

—Solid Electrolytic Capacitor Production Method—

A method for producing a solid electrolytic capacitor of this embodiment is described below. The production method includes a preparation step, a lamination step, and a curing step.

In the preparation step, a plurality of capacitor elements 20 each having a first portion 21, and two second portions 24 is prepared. The first portion 21 includes a first edge 22 and a second edge 23 disposed opposite to each other, and a portion thereof forms a cathode portion 26. One second portion 24 projects from one end portion of the first edge 22 of the first portion 21, and forms an anode portion 25. The other second portion 24 projects from the other end portion of the first edge 22 of the first portion 21, and forms the anode portion 25. An insulating portion 27 that electrically insulates the cathode portion 26 from the anode portion 25 is formed at the remaining portion of the first portion 21.

In the lamination step, the plurality of capacitor elements 20 are laminated with a conductive paste (not shown) interposed therebetween so that the first edge 22 of the capacitor element A is positioned at one side in the first direction D1 and the first edge 22 of the capacitor element B is positioned at the other side in the first direction D1. In this lamination step, the capacitor element A and the capacitor element B are laminated alternately one by one. The conductive paste is a paste including silver.

Figure 3:
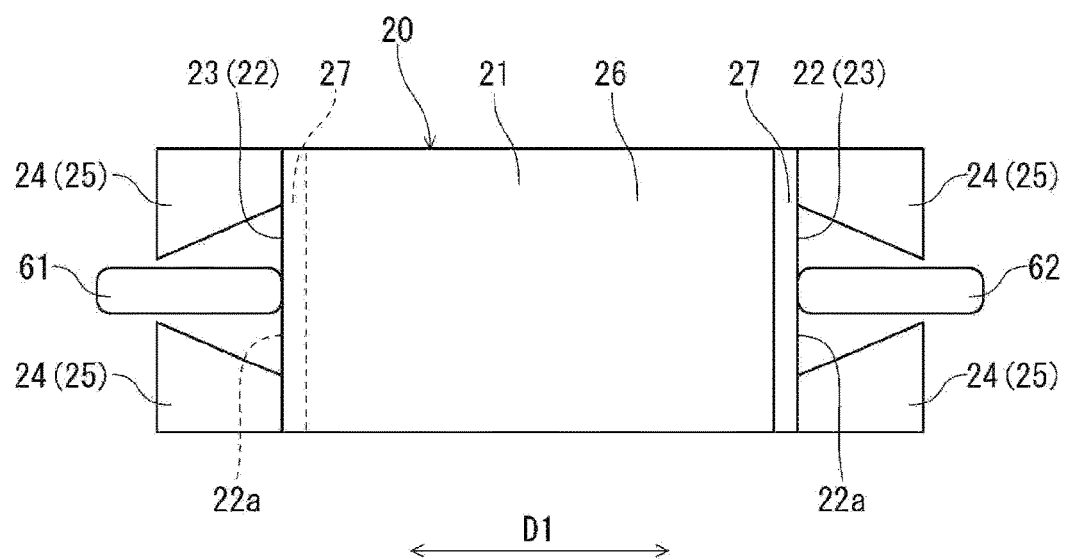
FIG. 3 is a plan view illustrating a curing step included in a method for producing a solid electrolytic capacitor of Embodiment 1.

In the curing step, as shown in FIG. 3, the conductive paste is cured while allowing a first jig 61 and a second jig 62 to abut on the laminated plurality of capacitor elements 20. In this curing step, while the first jig 61 is abutted on the first edge 22 (to be specific, a flat portion 22a) and the second edge 23 of one side in the first direction D1 (left side in FIG. 3), the second jig 62 is abutted on the first edge 22 (to be specific, a flat portion 22a) and the second edge 23 of the other side in the first direction D1 (right side in FIG. 3). The first jig 61 and the second jig 62 are disposed to face each other in the first direction D1. The shape of the first jig 61 and the second jig 62 may be any shape as long as they are accessible to the first edge 22 and the second edge 23.

Curing of the conductive paste can be performed by, for example, pressing an iron (not shown) as a heat source against the laminated plurality of capacitor elements 20 from above. Even when the iron is pressed, because the plurality of capacitor elements 20 are held with the first jig 61 and the second jig 62, occurrence of misalignment of the plurality of capacitor elements 20 in the first direction D1 can be suppressed. The misalignment of the plurality of capacitor elements 20 in the direction orthogonal to the first direction D1 (up-down direction in FIG. 3) can be suppressed by a known method.

Afterwards, the plurality of (in this example, two) anode portions 25 of the capacitor element A are put together and the plurality of (in this example, two) anode portions 25 of the capacitor element B are put together, and they are welded along with anode lead frames 31 corresponding thereto. The welding may be, for example, laser welding or electric resistance welding. Then, after attaching an anode lead terminal 41, a cathode lead frame 32, and a cathode lead terminal 42, the entire product is sealed with an exterior resin 50. The solid electrolytic capacitor 10 of this embodiment is obtained in this manner.

The solid electrolytic capacitor 10 in which the plurality of anode portions 25 are put together and welded is described, but the present invention is not limited thereto. For example, although not shown, the techniques of the present disclosure can also be applied to a solid electrolytic capacitor having a so-called end face current collecting structure, in which the end faces are connected to plate type anode terminals without putting the plurality of anode portions 25 together.

Embodiment 2

Embodiment 2 of the present disclosure is described. In this embodiment, the configuration of each of the capacitor elements 20 is different from the above-described Embodiment 1. In the following, the points differing from the above-described Embodiment 1 are mainly described.

Figure 4:
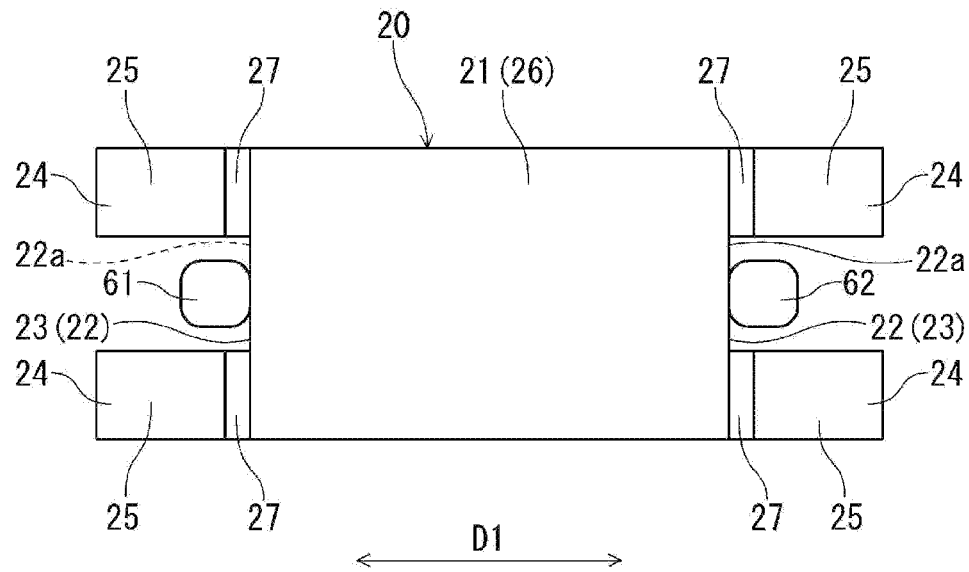
FIG. 4 is a plan view illustrating a curing step included in a method for producing a solid electrolytic capacitor of Embodiment 2.

As shown in FIG. 4, the second portion 24 is formed into a rectangular sheet. The width of the second portion 24 is substantially constant from the proximal end portion to the tip end portion. A portion of the second portion 24 forms an anode portion 25 of the capacitor element 20. An insulating portion 27 is formed on the remaining portion (a portion at the first portion 21 side) of the second portion 24. In this manner, in this embodiment, the insulating portion 27 is included in the second portion 24, not the first portion 21. The width of the insulating portion 27 is substantially the same with the width of the anode portion 25.

Embodiment 3

Embodiment 3 of the present disclosure is described. In this embodiment, the configuration of each of the capacitor elements 20 is different from the above-described Embodiment 1. In the following, the points differing from the above-described Embodiment 1 are mainly described.

Figure 5:
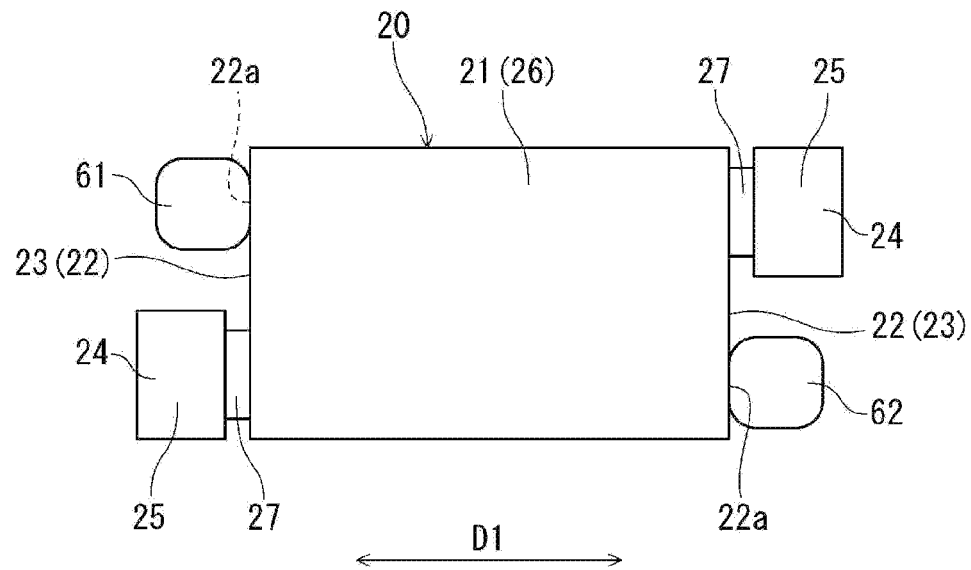
FIG. 5 is a plan view illustrating a curing step included in a method for producing a solid electrolytic capacitor of Embodiment 3.

As shown in FIG. 5, each of the capacitor elements 20 has one second portion 24. In each of the capacitor elements 20, the second portion 24 projects from a portion toward one end side of the first edge 22. Thus, in each of the capacitor elements 20, one flat portion 22a is formed in a region toward the other end of the first edge 22. The second portion 24 is formed into a rectangular sheet. The width of the second portion 24 is substantially constant from the proximal end portion to the tip end portion. A portion of the second portion 24 forms an anode portion 25 of the capacitor element 20. An insulating portion 27 is formed on the remaining portion of the second portion 24 (a portion of the first portion 21 side). In this manner, in this embodiment, the insulating portion 27 is included in the second portion 24, not the first portion 21. The width of the insulating portion 27 is smaller than the width of the anode portion 25.

—Curing Step—

As shown in FIG. 5, in the curing step, the first jig 61 and the second jig 62 are disposed so as not to face each other in the first direction D1. To be specific, in the curing step of this embodiment, the first jig 61 is disposed at one side (upper side in FIG. 5) in a direction orthogonal to the first direction D1 (up-down direction in FIG. 5), and the second jig 62 is disposed at the other side in the direction orthogonal to the first direction D1.

Embodiment 4

Embodiment 4 of the present disclosure is described. In this embodiment, the configuration of each of the capacitor elements 20 is different from the above-described Embodiment 1. In the following, the points differing from the above-described Embodiment 1 are mainly described.

Figure 6:
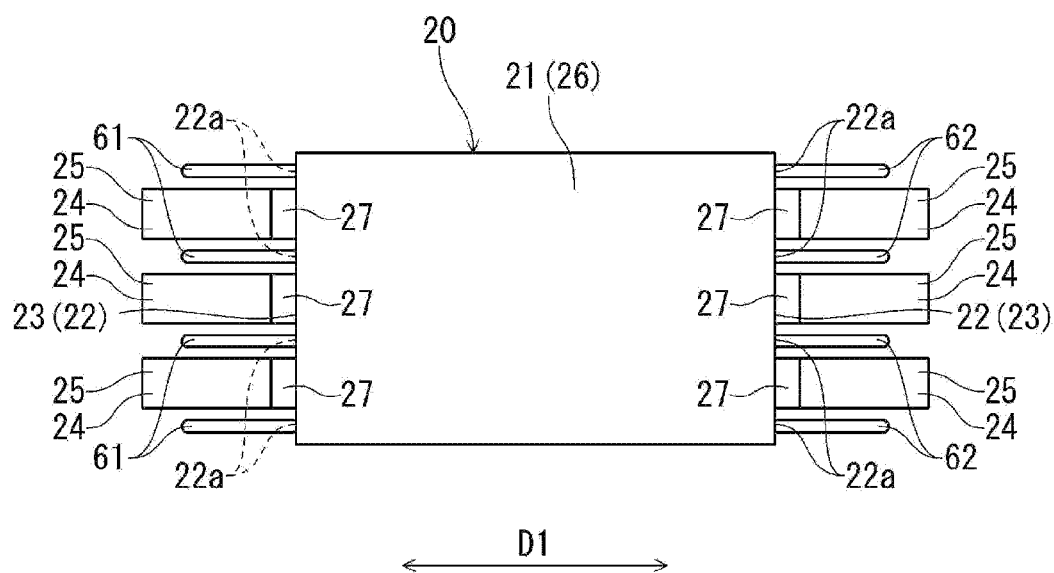
FIG. 6 is a plan view illustrating a curing step included in a method for producing a solid electrolytic capacitor of Embodiment 4.

As shown in FIG. 6, each of the capacitor elements 20 has three second portions 24. In each of the capacitor elements 20, the three second portions 24 each projects from a portion toward one end of the first edge 22, a center portion of the first edge 22, and a portion toward the other end of the first edge 22. Thus, in each of the capacitor elements 20, at the first edge 22, a total of four flat portions 22a are formed at both end portions and between each of the second portions 24. Each of the second portions 24 is formed into a rectangular sheet. The width of the second portion 24 is substantially constant from the proximal end portion to the tip end portion. A portion of the second portion 24 forms an anode portion 25 of the capacitor element 20. An insulating portion 27 is formed on the remaining portion (a portion of the first portion 21 side) of the second portion 24. In this manner, in this embodiment, the insulating portion 27 is included in the second portion 24, not the first portion 21. The width of the insulating portion 27 is substantially the same with the width of the anode portion 25.

—Curing Step—

As shown in FIG. 6, in the curing step, four first jigs 61 and four second jigs 62 are disposed so as to face each other in the first direction D1. Each of the first jigs 61 and each of the second jigs 62 are disposed so as to abut on each of the flat portions 22a.

Embodiment 5

Embodiment 5 of the present disclosure is described. In this embodiment, the configuration of each of the capacitor elements 20 is different from the above-described Embodiment 1. In the following, the points differing from the above-described Embodiment 1 are mainly described.

Figure 7:
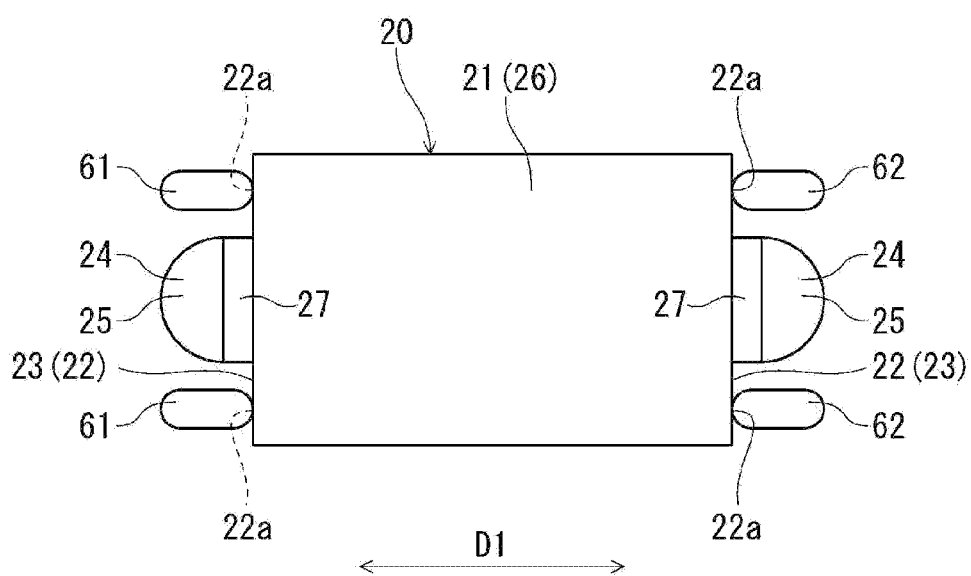
FIG. 7 is a plan view illustrating a curing step included in a method for producing a solid electrolytic capacitor of Embodiment 5.

As shown in FIG. 7, each of the capacitor elements 20 has one second portion 24. In each of the capacitor elements 20, the second portion 24 projects from a center portion of the first edge 22. Thus, in each of the capacitor elements 20, a total of two flat portions 22a are formed at its both end portions in the first edge 22. The tip end portion of the second portion 24 is formed into an arc. A portion of the second portion 24 forms an anode portion 25 of the capacitor element 20. An insulating portion 27 is formed on the remaining portion of the second portion 24 (a portion of the first portion 21 side). In this manner, in this embodiment, the insulating portion 27 is included in the second portion 24, not the first portion 21. The width of the insulating portion 27 is substantially the same with the width of the proximal end portion of the anode portion 25.

—Curing Step—

As shown in FIG. 7, in the curing step, two first jigs 61 and two second jigs 62 are disposed so as to face each other in the first direction D1. Each of the first jigs 61 and each of the second jigs 62 are disposed so as to abut on each of the flat portions 22a.

INDUSTRIAL APPLICABILITY

The present disclosure can be applied to a solid electrolytic capacitor and a production method therefor.

REFERENCE SIGNS LIST

10: solid electrolytic capacitor
  20: capacitor element
  21: first portion
    22: first edge
      22a: flat portion
    23: second edge
  24: second portion
  25: anode portion
  26: cathode portion
  27: insulating portion
  31: anode lead frame
  32: cathode lead frame
  41: anode lead terminal
  42: cathode lead terminal
  50: exterior resin
  61: first jig
  62: second jig
D1: first direction

The invention claimed is:

1. A solid electrolytic capacitor comprising: a plurality of capacitor elements laminated on top of each other, the capacitor elements each including a first portion and a second portion,
wherein the first portion includes a first edge and a second edge disposed opposite to each other in a first direction and at least a portion of the first portion forms a cathode portion,
the first edge includes
a flat portion formed in a center region of the first edge, and
a portion away from the center region of the first edge and from which the second portion projects,
the second portion does not project from the flat portion, and at least a portion of the second portion forms an anode portion,
in a first subset of the plurality of capacitor elements, the first edge is positioned at one side in the first direction, and the second edge is positioned at the other side in the first direction, and
in a second subset of the plurality of capacitor elements, the first edge is positioned at the other side in the first direction and the second edge is positioned at the one side in the first direction.

2. The solid electrolytic capacitor of claim 1, wherein the capacitor element of said one or some of the plurality of capacitor elements and the capacitor element of the remaining of the plurality of capacitor elements are laminated alternately one by one.

3. The solid electrolytic capacitor of claim 1, wherein each of the capacitor elements has three or less second portions.

4. The solid electrolytic capacitor of claim 1, wherein each of the capacitor elements has two second portions, and
in each of the capacitor elements, one of the second portions projects from one end portion of the first edge, and the other of the second portions projects from the other end portion of the first edge.

5. The solid electrolytic capacitor of claim 1, wherein in each of the capacitor elements, a total of a width of a proximal end portion of the second portion is 20% or more and 90% or less of the length of the first edge.

6. The solid electrolytic capacitor of claim 1, wherein a width of a tip end portion of the second portion is larger than a width of a proximal end portion of the second portion.

7. A method for producing a solid electrolytic capacitor, the method comprising the steps of:
a preparation step of preparing a plurality of capacitor elements, the capacitor elements each including a first portion and a second portion, wherein the first portion includes a first edge and a second edge disposed opposite to each other and at least a portion of the first portion forms a cathode portion, and the second portion projects from a portion of the first edge of the first portion and at least a portion of the second portion forms an anode portion,
a lamination step of laminating the plurality of capacitor elements with a conductive paste interposed therebetween so that one or some of the first edges are positioned at one side in a first direction and the remaining first edges are positioned at the other side in the first direction, and
a curing step of curing the conductive paste while allowing a first jig and a second jig to abut on the laminated plurality of capacitor elements, wherein the first jig is abutted on the first edge and the second edge at one side in the first direction and the second jig is abutted on the first edge and the second edge at the other side in the first direction.

8. The solid electrolytic capacitor of claim 1, wherein a ratio of a total length of the flat portion to a total length of the first edge is ⅓ or more.

9. The solid electrolytic capacitor of claim 1, wherein the first subset of the plurality of capacitor elements and the second subset of the plurality of capacitor elements are adjacent to each other.

* * * * *